United States Patent
Kagalwala et al.

(10) Patent No.: US 6,961,730 B2
(45) Date of Patent: Nov. 1, 2005

(54) MAPPING DATABASE FILE CLASS TO OPERATING SYSTEM FILE CLASS IN A COMPUTER SCHEMA

(75) Inventors: Raxit A. Kagalwala, Issaquah, WA (US); John Patrick Thompson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 09/789,331

(22) Filed: Feb. 20, 2001

(65) Prior Publication Data

US 2002/0156790 A1 Oct. 24, 2002

Related U.S. Application Data (60) Provisional application No. 60/252,137, filed on Nov. 17, 2000.

(51) Int. Cl.[7] .............................................. G06F 17/30
(52) U.S. Cl. ................ 707/102; 707/103 R; 707/104.1; 709/217
(58) Field of Search ............................ 707/100, 103 R, 707/102, 200, 1, 3, 4, 10, 104.1, 101; 709/310, 103, 217–219

(56) References Cited

U.S. PATENT DOCUMENTS

| | | |
|---|---|---|
| 5,596,745 A | 1/1997 | Lai et al. |
| 5,692,129 A | 11/1997 | Sonderegger et al. |
| 5,794,030 A | 8/1998 | Morsi et al. |
| 5,937,409 A | 8/1999 | Wetherbee |
| 5,956,725 A | 9/1999 | Burroughs et al. |
| 5,956,730 A * | 9/1999 | Burroughs et al. ...... 707/104.1 |
| 6,081,808 A | 6/2000 | Blackman et al. |
| 6,085,198 A | 7/2000 | Skinner et al. |
| 6,125,363 A | 9/2000 | Buzzeo et al. |
| 6,134,559 A | 10/2000 | Brumme et al. |
| 6,157,928 A | 12/2000 | Sprenger et al. |
| 6,163,776 A | 12/2000 | Periwal |
| 6,170,005 B1 * | 1/2001 | Meandzija .................. 709/217 |
| 6,243,709 B1 | 6/2001 | Tung |
| 6,289,339 B1 | 9/2001 | Weber |
| 6,317,748 B1 | 11/2001 | Menzies et al. |
| 6,330,555 B1 | 12/2001 | Weber |
| 6,374,252 B1 | 4/2002 | Althoff et al. |
| 6,374,253 B1 | 4/2002 | Weider et al. |
| 6,374,256 B1 | 4/2002 | Ng et al. |
| 6,405,202 B1 | 6/2002 | Britton et al. |
| 6,493,719 B1 | 12/2002 | Booth et al. |
| 6,496,833 B1 | 12/2002 | Goldberg et al. |
| 6,569,207 B1 | 5/2003 | Sundaresan |
| 6,571,232 B1 | 5/2003 | Goldberg |
| 2002/0059293 A1 * | 5/2002 | Hirsch .................... 707/103 R |
| 2002/0107872 A1 | 8/2002 | Hudis et al. |
| 2002/0116385 A1 | 8/2002 | Kagalwala et al. |
| 2002/0156790 A1 | 10/2002 | Kagalwala et al. |

* cited by examiner

*Primary Examiner*—Shahid Al Alam
(74) *Attorney, Agent, or Firm*—Lee & Hayes, PLLC (57) ABSTRACT

Described herein is a schema extension of the Common Information Model (CIM), designed to model manageable aspects of a database server such as a Structure Query Language (SQL) server. The database schema contains a data file class that represents files associated with databases. The operating system also has a data file class, representing files that are managed by the operating system. An association is defined between the two data file classes, allowing queries to navigate between the database schema and the operating system schema.

28 Claims, 3 Drawing Sheets

MAPPING DATABASE FILE CLASS TO OPERATING SYSTEM FILE CLASS IN A COMPUTER SCHEMA

RELATED APPLICATIONS

This application claims priority to U.S. Provisional Application No. 60/252,137, filed Nov. 17, 2000, entitled "Mapping Database File Class to Operating System File Class in a Computer Schema."

TECHNICAL FIELD

This invention relates to databases, database management systems, and database management schemas.

BACKGROUND

Database management systems (DBMS) are core components of virtually every enterprise (e-business) application. The ability to effectively configure, monitor, and manage a DBMS is critical to the success of enterprise applications.

Most DBMSs are designed for compatibility with relational databases. A relational database comprises a plurality of tables. Each table has a plurality of data records (rows) and each table includes a definition of the fields (columns) that the records will contain. A relational database includes the specification of relationships between fields of different tables. A DBMS performs common management tasks such as creating databases, adding tables, replication management, data backup, etc.

The Desktop Management Task Force (DMTF) Common Information Model (CIM) is an approach to the management of systems, software, users, and networks that applies the basic structuring and conceptualization techniques of the object-oriented paradigm. More specifically, the purpose of CIM is to model various computer-related systems—both hardware and software. It is important to recognize that object-oriented modeling is different from object-oriented programming.

This type of modeling uses schemas to represent systems. A schema is an abstraction of something that exists in the real world. Generally, a schema comprises a collection of classes and associations.

A class models a set of objects that have similar properties and fulfill similar purposes. In a database management schema, for example, individual classes might define such things as files, users, tables, etc.

Classes follow a hierarchical structure. Classes can have subclasses, also referred to as specialization classes. The parent class of a subclass is referred to as a superclass or a generalization class. A class that does not have a superclass is referred to as a base class.

A typical schema might comprise a collection of different schemas, which in this case can also be referred to as subschemas. Such subschemas are often located in various different namespaces. A namespace is simply a way to logically group related data. Within a given namespace, all names are unique. Within the following disclosure, the terms "schema" and subschema are used interchangeably.

A subclass inherits properties of its superclass. All properties and methods of a superclass apply to the subclass.

Figure 1:
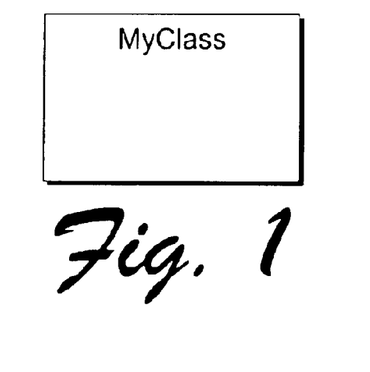
FIGS. 1–3 illustrate CIM drawing conventions.
Figure 2:
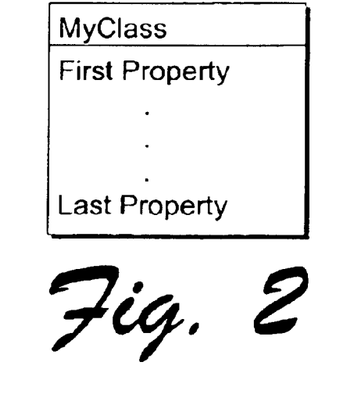
Figure 3:
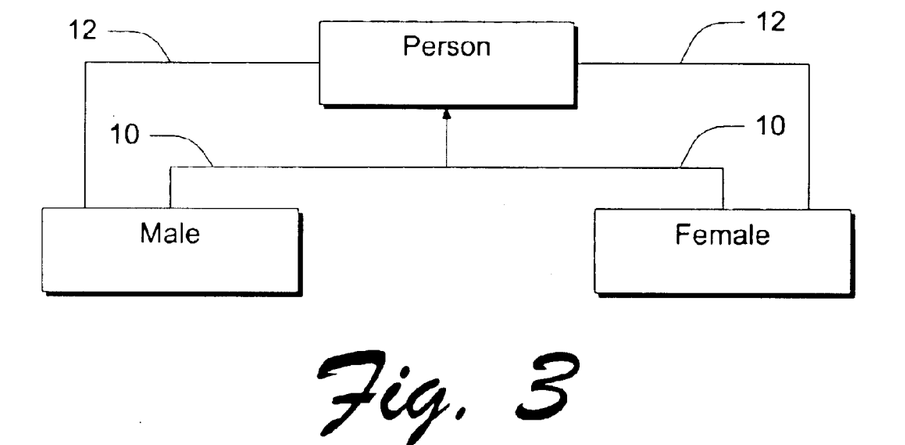

It is conventional to represent a class by a rectangle containing the name of the class. FIG. 1 shows an example. A class with properties is represented by a rectangle divided into two regions as in FIG. 2, one containing the name of the class and the other a list of properties. Inheritance, or a subclass/superclass relationship, is represented by a line drawn between the subclass and the superclass, with an arrow adjacent to the superclass indicating the superclass. Lines representing inheritance are shown in FIG. 3, indicated by reference numeral 10.

Classes contain instances that are collections of values that conform to the type established by the class. Instances are identified by keys that are unique within the class. In other words, no two instances in the same class in the same namespace may have the same values for all of their key values. The term "object" may be used to refer to either an instance or a class.

An association represents a relationship between two or more objects. More specifically, an association is a mechanism for providing an explicit mapping between classes. Associations can be within a namespace or across namespaces. Associations are conventionally shown as a line between two classes, as indicated by reference number 12 in FIG. 3.

CIM schemas describe the gamut of managed elements: servers and desktops (operating systems, components, peripherals, and applications, all layers of the network (from Ethernet switches to IP and HTTP connections), and even end-users. Schema properties model the attributes that apply to objects, such as the type of printer or storage medium, RAM and CPU capacity, storage capacity, etc.

The discussion above gives a general overview of object-oriented modeling and CIM. Please refer to Winston Vumpus, John W. Sweitzer, Patrick Thompson, Andrea R. Westerinin, and Raymond C. Williams; *Common Information Model*, John Wiley & Sons, Inc., New York (2000) for further information regarding CIM. Also refer to Common Information Model (CIM) Specification, V2.0, Mar. 3, 1998, available from the Distributed Management Taskforce. DMTF has a number of other resources on its Internet web site.

DETAILED DESCRIPTION

The following description sets forth a specific embodiment of a portion of a computer system management schema. This embodiment incorporates elements recited in the appended claims. The embodiment is described with specificity in order to meet statutory requirements. However, the description itself is not intended to limit the scope of this patent. Rather, the inventors have contemplated that the claimed invention might also be embodied in other ways, to include different elements or combinations of elements similar to the ones described in this document, in conjunction with other present or future technologies.

Figure 4:
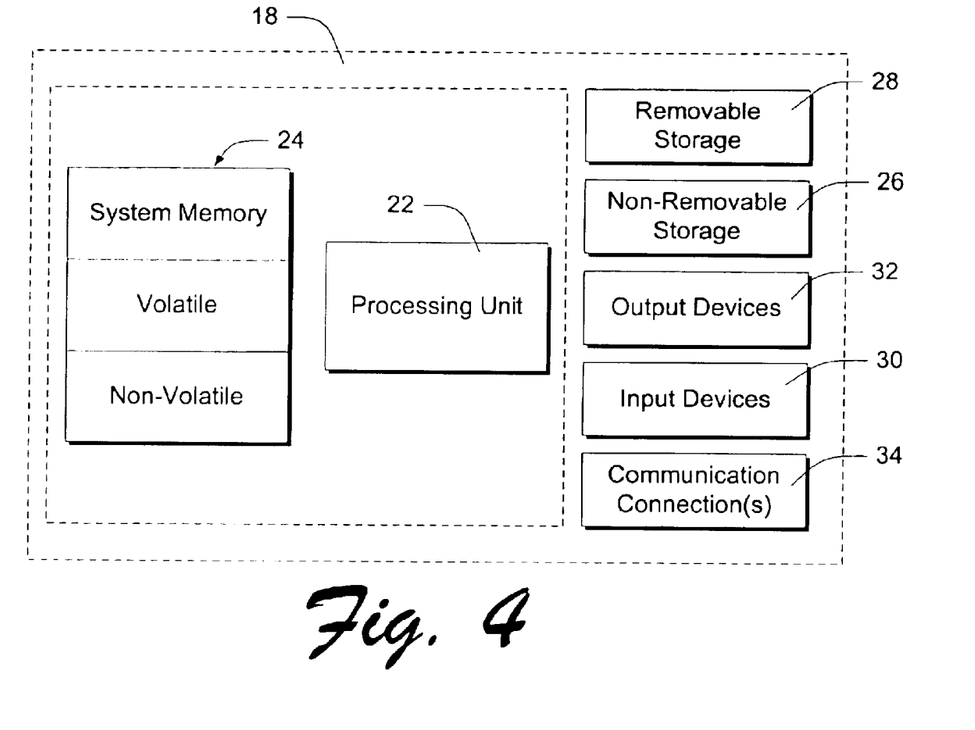
FIG. 4 is a block diagram showing components of a typical computer.

FIG. 4 illustrates an example of a suitable operating environment 18 in which the invention may be implemented. The operating environment 18 is a computer, which is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor system, programmable consumer electronics, network PCs, minicomputers, mainframe computers, distributed computing environments that include any of the above systems or devices, and the like.

The functionality of the computer is embodied in many cases by computer-executable instructions, such as program modules, that are executed by the computer. Generally, program modules include routines, programs, objects, components, data structures, etc. that perform particular tasks or implement particular abstract data types. Tasks might also be performed by instructions from remote processing devices that are linked through a communications network. In a distributed computing environment, program modules may be located in both local and remote computer storage media 28.

Computer 18 typically includes a variety of computer-readable media. Computer-readable media can be any available media that can be accessed by computer 18 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 18. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The instructions and/or program modules reside at different times in the various computer-readable media available to the computer. Programs are typically distributed on some type of removable and/or remote media, or by a server on some form of communication media. From there, they are installed or loaded into the secondary disk memory of a computer. At execution, they are loaded at least partially into the computer's primary electronic memory. The invention described herein includes these and other various types of computer-readable media when such media contain instructions programs, and/or modules for implementing the operations described below in conjunction with a microprocessor or other data processors. The invention also includes the computer itself when programmed according to the operations described below.

For purposes of illustration, programs and other executable program components in are illustrated in FIG. 4 as discrete blocks, although it is recognized that such programs and components reside at various times in different storage components of the computer, and are executed by the data processor(s) of the computer.

As shown in FIG. 4, computer 18 typically includes a processing unit 22 and internal computer-storage media 24. The computer may also have other non-removable storage 26 and removable storage 28. Device 20 may have input/output devices 30 and 32 such as a keyboard, mouse, stylus, display device, sound card, etc. In addition, the device might include network connections 34 to other devices, computers, networks, servers, etc. using either wired or wireless media. All these components are well known in the art and need not be discussed at length here. Many other components might also be present.

Figure 5:
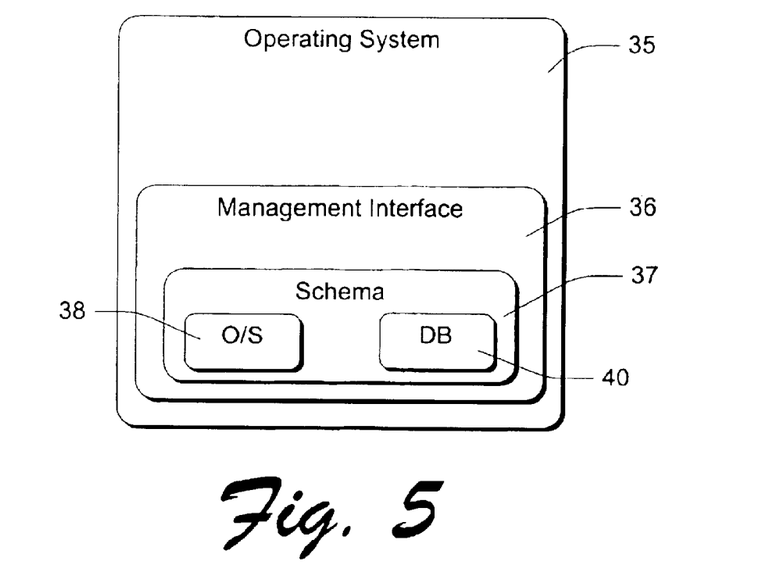
FIG. 5 illustrates an operating system and its computer management component, along with a schema that models the computer.

FIG. 5 is a logical representation of pertinent executable components and if data structures relating to an operating system's management infrastructure. The elements shown in FIG. 5 might be maintained in a single computer, or might be maintained in a plurality of computers. They reside in various types of computer-readable memory. It should be noted that parts or all of the system might be implemented by something other than a conventional computer.

The example shown by FIG. 5 includes an operating system 35. The "Windows" brand of operating systems, available from Microsoft Corporation of Redmond, Washington, is one example of a suitable operating system.

The "Windows 2000" operating system includes a service known as "Windows Management Instrumentation" (WMI) 36. WMI is an examplary management infrastructure for managing the operating system, applications, and computer hardware. It includes Microsoft's implementation of the Web-Based Enterprise Management (WBEM) initiative, an industry standard administered by the Distributed Management Task Force (DMTF). WMI provides an object-oriented way of monitoring, configuring and controlling systems, services, and applications on the Windows platform. WMI objects consist of classes and instances of classes. The WMI classes may be derived from standard classes defined in the Common Information Model (CIM). WMI provides services such as SQL query language support and programmable event notification.

To support CIM, WMI maintains a system management schema definition 37. In many cases, schema definition 37 is stored in the WMI repository. The schema contains a definition of the classes, along with the properties and methods of these classes. The classes in a schema may be declared in one or more namespaces.

System management schema 37 includes an operating system schema or subschema 38 that represents manageable components of a computer's operating system. The system management schema and its operating system subschema conform to the CIM definition, and possibly include CIM extensions or extension schemas. The namespace containing the operating schema 38 will be referred to herein as the operating system namespace.

In addition to the operating schema 38, the inventors have developed a database schema or subschema 40 for use in conjunction with or as part of the system management schema 37 of WMI (or other management systems) to represent manageable components of an SQL (Structured Query Language) server. In particular, the database schema 40 represents components of the "Microsoft SQL Server," although a schema such as this can also support other databases.

The database schema 40 represents managed database objects such as tables, files, configuration data, and other logical components. The database schema is located in its own namespace, which will be referred to herein as the database namespace.

Figure 6:
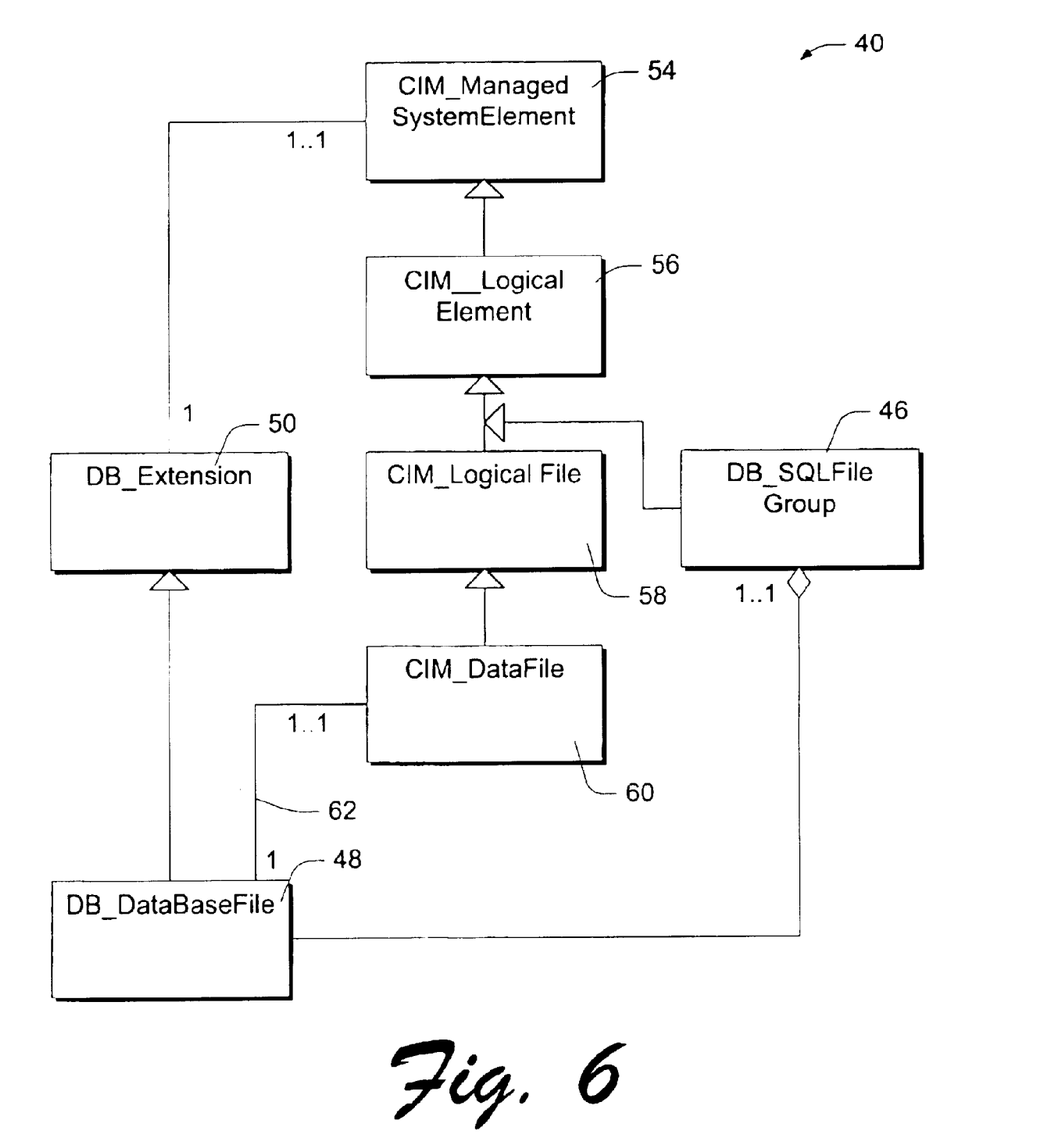
FIG. 6 shows portions of a database schema, which contains a view of CIM classes.

FIG. 6 shows portions of database schema 40. The classes shown in FIG. 6 relate to files that are maintained by the operating system and by the managed database.

Database schema 40 is defined within its own database namespace. FIG. 6 shows only the pertinent classes and associations within this namespace. The database namespace also includes other classes and associations (not shown) that are not pertinent to the invention. In addition, pertinent CIM or operating system classes are represented by creating a "view," in the database namespace, of the appropriate operating system or CIM classes. A view is a mechanism by which one can "mirror" a class and its instances from another namespace. Creating is views allows one to define associations and dependencies between CIM classes, without requiring cross-namespace association capabilities.

Database 40 schema includes classes related to the database itself. These classes are prefixed in FIG. 6 with "DB" and are part of a CIM extension. In addition, a view of certain parts of operating system schema 38 is created within namespace 42. Of these, FIG. 6 shows those operating system schema classes related to computer files. These classes are prefixed with "CIM".

The illustrated database-related classes include (a) a file group class 46 (DB_SQLFileGroup), (b) a database file class 48 (DB_DataBaseFile), and (c) a database extension class 50 (DB_Extension).

File group class 46 represents a group of files that together physically store the information of a database. The properties, methods, and associations of a specific implementation this class are listed below.

Properties
  string Caption
    Access Type: Read-only
    Description: The Caption property is a short textual description (one-line string) of the object.
    Maximum Length: 64
  [key] string DatabaseName
    Access Type: Read-only
    Description: The DatabaseName property indicates the name of the database that the object is a part of.
    Maximum Length: 128
  boolean Default
    Access Type: Read/Write
    Description: The Default property indicates the filegroup used when no filegroup is specified as part of table or index creation. If TRUE, the referenced filegroup is used to implement table or index data storage when a table or index is created and no filegroup is specified. If FALSE, the referenced filegroup is not used as the default in table and index creation. The filegroup may be specified by name to direct creation.
  string Description
    Access Type: Read-only
    Description: The Description property provides a textual description of the object.
  datetime InstallDate
    Access Type: Read-only
    Description: The InstallDate property is datetime value indicating when the object was installed. A lack of a value does not indicate that the object is not installed.
  [key] string Name
    Access Type: Read-only
    Description: The Name property defines the label by which the object is known. When subclassed, the Name property can be overridden to be a Key property.
  boolean ReadOnly
    Access Type: Read/Write
    Description: The ReadOnly property controls the ability to update a Microsoft® SQL Server™ database or database filegroup. If TRUE, data in the database or database filegroup cannot be changed. If FALSE, updates are allowed to data in the database or database filegroup.
  sint32 Size
    Access Type: Read-only
    Description: The Size property exposes the total size, in megabytes, of the filegroup.
  [key] string SQLServerName
    Access Type: Read-only
    Description: The SQLServerName property indicates the name of the SQL Server™ installation that the object is a part of.
    Maximum Length: 128
  string Status
    Access Type: Read-only
    Description: The Status property is a string indicating the current status of the object. Various operational and non-operational statuses can be defined. Operational statuses are "OK", "Degraded" and "Pred Fail". "Pred Fail" indicates that an element may be functioning properly but predicting a failure in the near future. An example is a SMART-enabled hard drive. Non-operational statuses can also be specified. These are "Error", "Starting", "Stopping" and "Service". The latter, "Service", could apply during mirror re-silvering of a disk, reload of a user permissions list, or other administrative work. Not all such work is on-line, yet the managed element is neither "OK" nor in one of the other states.
    Values are: "OK", "Error", "Degraded", "Unknown", "Pred Fail", "Starting", "Stopping", "Service"
    Maximum Length: 10
  uint32 Type
    Description: This property indicates the type of the file group. The file group can be of three types. It is either a user defined file group, a primary file group, or a filegroup defined on files maintained on read-only media. When a database is created, it is created on exactly one filegroup named PRIMARY. This is the primary file group. After database creation, filegroups can be added to the database. These are the user defined file groups.

| Value | Description |
| --- | --- |
| 0 | User Defined |
| 8 | On Read-Only Media |
| 16 | Primary |

Methods

| Method Name | Description |
| --- | --- |
| CheckFilegroup | The CheckFilegroup method scans and tests the integrity of database pages maintained in operating system files implementing the referenced filegroup. |
| CheckFilegroupDataOnly | The CheckFilegroupDataOnly method scans and tests the integrity of database pages that are used to maintain table data in the operating system files implementing the referenced filegroup. |
| EnumStoredObjects | The EnumStoredObjects method enumerates the names of the indexes, tables and statistical mechanisms stored in the filegroup. |

Associations

DB_FileGroup is associated to DB_Database as the Antecedent property of the DB_DatabaseFileGroup association.

DB_FileGroup is associated to DB_Table as the Antecedent property of the DB_TableFileGroup association.

DB_FileGroup is associated to DB_Table as the Antecedent property of the association.

DB_FileGroup is associated to DB_Index as the Antecedent property of the DB_IndexFileGroup association.

DB_FileGroup is associated to DB_CandidateKey as the Antecedent property of the association.

DB_FileGroup is associated to DB_DatabaseFile as the GroupComponent property of the association.

Note: some of the associations are to classes that are not shown in FIG. 6.

Database file class 48 is an extension to the CIM_DataFile class. It contains properties that are relevant to an operating system file that is also a file storing database data. These database files belong to the respective file groups of file group class 46. The properties, methods, and associations of a specific implementation this class, referred to as the "DB_DatabaseFile" class, are listed below.

Properties

[key] string DatabaseName
  Access Type: Read-only
  Description: The DatabaseName property indicates the name of the database that the object is a part of.
  Maximum Length: 128

[key] string FileGroupName
  Access Type: Read-only
  Description: The FileGroupName property indicates the name of the database file group that the database file is a part of.
  Maximum Length: 128 sint32 FileGrowth
  Access Type: Read/Write
  Description: The FileGrowth property indicates the growth increment of the operating system file used to store table, index, or log data. When FileGrowthType is Megabytes, the FileGrowth value represents the number of megabytes of disk space to allocate for incremental file growth. When FileGrowthType is Percent, the value represents a percentage and must be in the range from 1 through 100.

real32 FileGrowthInKB
  Access Type: Read-only
  Description: The FileGrowthInKB property reports the number of kilobytes of disk space allocated when an incremental increase occurs on an operating system file.

uint32 FileGrowthType
  Access Type: Read/Write
  Description: The FileGrowthType property indicates the method of incremental allocation applied when an operating system file is extended.

| Value | Description |
| --- | --- |
| 0 | Megabyte |
| 1 | Percent |
| 99 | Invalid | sint32 MaximumSize
  Access Type: Read/Write
  Description: The MaximumSize property indicates an upper limit for the size of an operating system file containing table and index data, or maintaining a database transaction log.

[key] string Name
  Access Type: Read-only
  Description: The Name property defines the label by which the object is known.
  Maximum Length: 128 string PhysicalName
  Access Type: Read-only
  Description: The PhysicalName property specifies the path and file name of the operating system file storing Microsoft® SQL Server™ database or transaction log data.

boolean PrimaryFile
  Access Type: Read-only
  Description: The PrimaryFile property indicates whether the database file is the one that maintains the database-specific system tables. A SQL Server™ database can have at most one primary file.

sint32 SpaceAvailableInMB
  Access Type: Read-only
  Description: The SpaceAvailableInMB property returns the amount of disk resource, in megabytes, allocated and unused in operating system files implementing Microsoft® SQL Server™ database and database transaction log storage.
  Units: Megabytes

[key] string SQLServerName
  Access Type: Read-only
  Description: The SQLServerName property indicates the name of the SQL Server™ installation that the object is a part of.
  Maximum Length: 128

Methods

| Method Name | Description |
| --- | --- |
| Shrink | The Shrink method attempts to reduce the size of the database file. |

Database extension class 50 is an abstract class that represents extensions made via associations to a managed system element. Extensions are made via associations when it is not possible or desirable to extend a class by subclassing.

Database extension class 50 is associated to CIM_ManagedSystemElement.

The database file class 48 is a subclass of the database extension class 50.

The operating system classes include (a) a managed system element class 54, (b) a logical element class 56, which is a subclass of the managed system element class 54, (c) a logical file class 58, which is a subclass of logical element class 56, and (d) a data file class 60, which is a subclass of logical file subclass 58. These are standard classes, defined by CIM.

Managed system element class 54 represents management-specific system elements. Logical element 56 represents the logical aspects of system elements.

Logical element class 56 is the base class for all the classes that represent the logical aspects of things such as profiles, processes and devices.

Logical file class 58 represents a named collection of data (this can be executable code) located in a file system on a storage extent. Typically, such collections are files.

Files can be one of three types in the CIM model: directory, device file, or data file. Of these, only the data file class 60 is shown in FIG. 6.

The database file group class 46 represents a logical element, and is therefore subclassed from the CIM logical element class 56. Even though these two classes are in different namespaces, it is possible to define associations between the two classes because a view of the relevant CIM classes has been created within the database namespace.

Database extension class 50 represents an extension of a managed system element, while the CIM managed system element class 54 represents all managed system elements.

The inventors have recognized that the database file class 48 is technically a subclass of CIM data file class 60—a database file is one type of operating system or CIM data file. However, it is not advisable to define a dependency such as this because the CIM data file class 60 has already been subclassed in another namespace, using a different classification criteria—defining a dependency such as this between namespaces could create so-called "instance overlaps", in which identically keyed instances of different subclasses could not be distinguished from each other.

In addressing this problem, the inventors have defined an association 62 between the database file class 48 and the CIM data file class 60. This allows one to query an instantiated database schema to relate a database file to an operating system file. In order to obtain the operating system file information for the database file, the following query can be used in conjunction with WMI:

Associators Of
  {DB_DatabaseFile.Name="Northwind",
  DB_FileGroupName="primary",
  DB_DatabaseName="Northwind",
  DB_ServerName="MyServer"}
  where ResultClass=CIM_DataFile With an association such as this, WMI is able to addresses the potential difficulties of using disparate mechanisms to manage different applications. For example, in order to manage an enterprise, one needs to manage not only the database server, but also the operating system running on the machines, the e-mail servers, the web servers, etc. In order to deploy a reliable system that includes all such components, one needs the ability to manage and troubleshoot across these applications. Having a common interface for each of these components and allowing system administrators (as well as third party management applications) to seamlessly navigate from one subsystem to another, is a huge leap in making an enterprise more manageable.

Consider the case when a storage disk is about to fail in an e-commerce company. With a schema such as the one discussed above, the administrator can immediately determine the filegroups/databases that are hosted on the disk (this diagnostic process is made much easier by the WMI schema—it would be much harder without the associations in place). Smart management applications can in fact leverage the WMI schema and present the system administrator with precise information about the impact of one portion of the system.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims.

What is claimed is:

1. One or more computer-readable media comprising a data structure stored on the computer-readable memory in accordance with a plurality of schemas, the schemas comprising:

an operating system schema that models elements of a computer and its operating system;

a database schema that models elements of a database;

a file class within the operating system schema;

a file class within the database schema; and an association between the file class of the operating system schema and the file class of the database schema.

2. One or more computer-readable media as recited in claim 1, wherein the operating system schema and database schema are in different namespaces.

3. One or more computer-readable media as recited in claim 1, wherein the operating system schema is represented as a view within a database schema namespace.

4. One or more computer-readable media as recited in claim 1, wherein the operating system schema is a CIM schema.

5. One or more computer-readable media as recited in claim 1, wherein the database schema is a CIM extension.

6. One or more computer-readable media as recited in claim 1, wherein the data files represented by the database schema's file class are also represented by the operating system schema's file class.

7. One or more computer-readable media as recited in claim 1, further comprising:

a database file group class;

an association between the database file class and the database file group class.

8. One or more computer-readable media comprising a data structure stored on the computer-readable memory in accordance with one or more schemas for use in conjunction with an operating system schema, the operating system schema defining a file class that represents operating system files, the one or more schemas comprising:

a database schema that models elements of a database;

the database schema defining a file class that represents database files;

wherein the database files represented by the database schema's file class are also represented by a file class of the operating system schema; and an association between the operating system schema file class and the database schema file class, said association allowing queries that navigate between the operating system schema and the database schema.

9. One or more computer-readable media as recited in claim 8, wherein the operating system schema and database schema are in different namespaces.

10. One or more computer-readable media as recited in claim 8, wherein the operating system schema is represented as a view within a database schema namespace.

11. One or more computer-readable media as recited in claim 8, wherein the operating system schema is a CIM schema.

12. One or more computer-readable media as recited in claim 8, wherein the database schema is a CIM extension.

13. One or more computer-readable media as recited in claim 8, wherein the operating system schema is a CIM schema and the database schema is a CIM extension.

14. One or more computer-readable media as recited in claim 8, wherein the data files represented by the database schema's file class are also represented by the operating system schema's file class.

15. One or more computer-readable media as recited in claim 8, further comprising, within the database schema:
a file group class;
an association between the database file class and the file group class.

16. A computer programmed to implement a schema, the schema modeling at least portions of the computer, the schema comprising:
an operating system schema that models elements of the computer and its operating system;
a database schema that models elements of a database;
wherein the operating schema defines a file class that represents operating system files;
wherein the database schema defines a file class that represents database files;
wherein the database files represented by the database schema file class are also represented by the operating system schema file class; and
an association between the operating system schema file class and the database schema file class, said association allowing queries that navigate between the operating system schema and the database schema.

17. A computer as recited in claim 16, wherein the operating system schema and database schema are in different namespaces.

18. A computer as recited in claim 16, wherein the operating system schema is represented as a view within a database schema namespace.

19. A computer as recited in claim 16, wherein the operating system schema is a CIM schema.

20. A computer as recited in claim 16, wherein the database schema is a CIM extension.

21. A computer as recited in claim 16, wherein the operating system schema is a CIM schema and the database schema is a CIM extension.

22. A computer as recited in claim 16, further comprising, within the database schema:
a file group class;
an association between the database file class an the file group class.

23. A method of computer and database management, comprising:
modeling an operating system with an operating system schema in a first namespace;
modeling a database with a database schema in a second namespace;
representing operating system files by an operating system file class in the operating system schema;
representing database files by a database file class in the database schema;
creating a view of the operating system schema within the second namespace; and
creating an association in the second namespace between the operating system file class and the database file class, said association allowing queries that navigate between the operating system file class and the database file class.

24. A method as recited in claim 23, wherein the operating system schema is a CIM schema.

25. A method as recited in claim 23, wherein the database schema is a CIM extension.

26. A method as recited in claim 23, wherein the operating system schema is a CIM schema and the database schema is a CIM extension.

27. A method as recited in claim 23, wherein the data files represented by the database schema's file class are also represented by the operating system schema's file class.

28. A method as recited in claim 23, the operating system schema having a file group class, further comprising creating an association between the database file class and the operating system file group class.

* * * * *

UNITED STATES PATENT AND TRADEMARK OFFICE
CERTIFICATE OF CORRECTION

PATENT NO.        : 6,961,730 B2  
APPLICATION NO.   : 09/789331  
DATED             : November 1, 2005  
INVENTOR(S)       : Raxit A. Kagalwala et al.

Page 1 of 1

It is certified that error appears in the above-identified patent and that said Letters Patent is hereby corrected as shown below:

On the Title page, in field (56), under "U.S. Patent Documents" in column 1, line 2, above "5,596,745 A" insert -- 5,569,207 10/1996 Gisselberg et al. --.

In column 4, line 17, after "and" delete "if".

In column 5, line 17, after "Creating" delete "is".

In column 12, line 12, in Claim 22, after "class" delete "an" and insert -- and --, therefor.

Signed and Sealed this

Twenty-eighth Day of July, 2009

JOHN DOLL  
*Acting Director of the United States Patent and Trademark Office*